United States Patent [19]

Steele

[11] 3,801,844
[45] Apr. 2, 1974

[54] ROTOR MEMBER FOR ROTARY MAGNETIC POSITION INDICATOR

[75] Inventor: Gilbert V. Steele, Fort Wayne, Ind.

[73] Assignee: Bowmar Instrument Corporation, Fort Wayne, Ind.

[22] Filed: Dec. 1, 1972

[21] Appl. No.: 311,435

[52] U.S. Cl. .................... 310/156, 310/49, 340/379
[51] Int. Cl. ............................................ H02k 37/00
[58] Field of Search ......... 310/40, 46, 49, 156, 126; 340/378, 379, 319

[56] References Cited
UNITED STATES PATENTS

| | | | |
|---|---|---|---|
| 3,631,475 | 12/1971 | Quandt et al. | 310/156 X |
| 3,223,865 | 12/1965 | Gladstone | 310/156 X |
| 3,456,138 | 7/1969 | Huber | 310/49 |
| 3,588,888 | 6/1971 | Harden | 340/378 |

Primary Examiner—D. F. Duggan

[57] ABSTRACT

A rotor member for a rotary magnetic position indicator incorporating two abutting permanent magnets. The first permanent magnet is cylindrical and has oppositely polarized areas at the respective extremities of a diameter. The second permanent magnet has at least two polar projections joined by cylindrical surface portions, the projections being oppositely polarized. The magnets are oriented with the polarized areas and projections of the same polarity being generally axially aligned.

1 Claim, 9 Drawing Figures

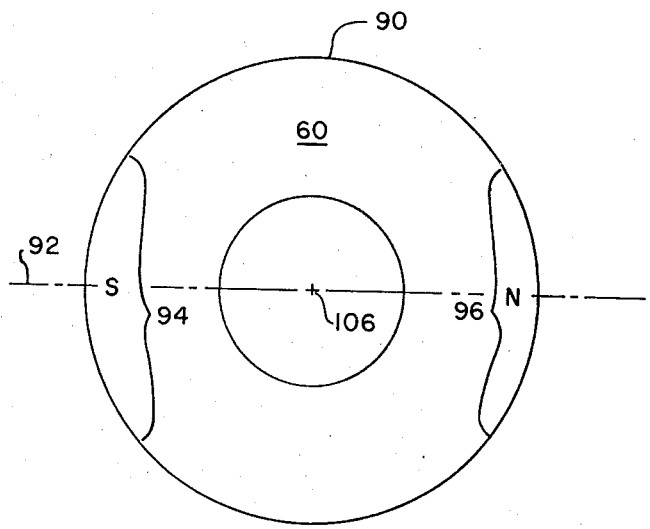
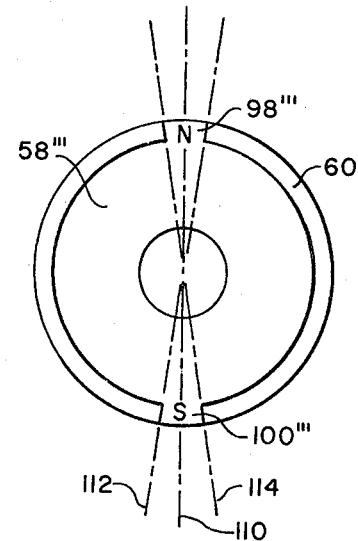
FIG-4
FIG-9
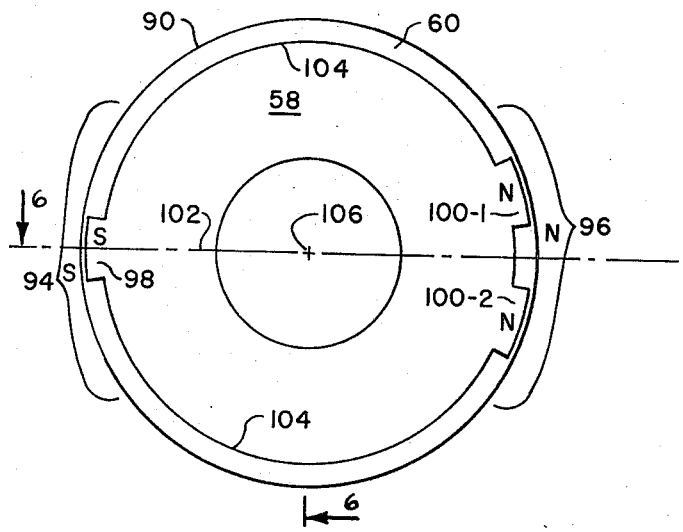
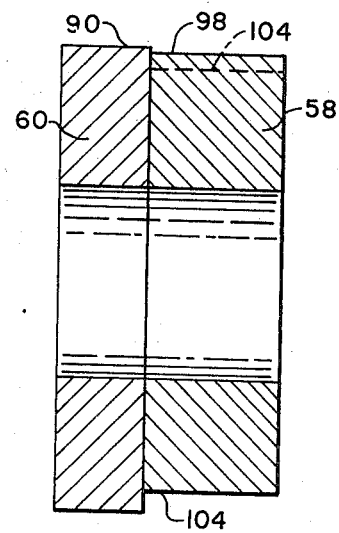
FIG-5
FIG-6
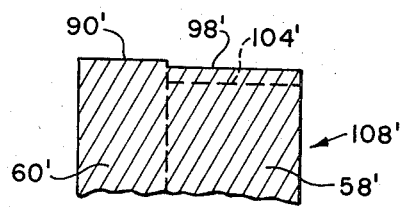
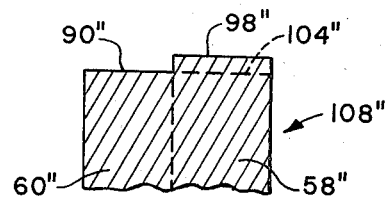
FIG-7
FIG-8

ROTOR MEMBER FOR ROTARY MAGNETIC POSITION INDICATOR

BACKGROUND OF THE INVENTION

1. Field of the Invention

This invention relates generally to rotary magnetic position indicators, and more particularly to a rotor member for such indicators.

2. Description of the Prior Art

Rotary magnetic position indicators are commonly employed for displaying discrete indicia in response to the characters of a prearranged code. A common type of such indicator comprises a permanent magnet rotor member and a stator structure having selectively energizable field windings thereon, the rotor carrying a drum having the indicia displayed on its surface. Selective energization of the field windings causes the magnetic axis of the rotor to align itself with respective poles of the field structure thereby to provide the desired rotational indication.

One common form of rotary magnetic position indicator, such as that shown in U.S. Pat. No. 3,371,333 assigned to the Assignee of the present application, employs a cylindrical permanent magnet rotor member, while another common form, as shown in U.S. Pat. Nos. 3,416,015 and 3,478,349, both assigned to the Assignee of the present application, employs a permanent magnet rotor member having salient poles.

A cylindrical permanent magnet rotor member provides maximum flux density acting on the current-carrying conductors of the stator thus providing maximum rotating or starting torque however, by virtue of the uniform air gap provided by the cylindrical configuration, a minimum "clogging" or locking effect is provided, i.e., a tendency to maintain a rotor locked-in at a given position in the power-off condition. On the other hand, while a much greater clogging or locking effect is provided by a permanent magnet rotor member having salient poles, substantially greater stator emf is required in order to rotate the rotor member away from a given position, and an increase in the starting torque by increasing the air gap is accompanied by a decrease in the locking torque. Furthermore, due to the inertia of the drum and rotor member, there is a tendency for the assembly to oscillate upon being rotated from one position to another, and a decrease in the air gap in order to reduce the oscillation is accompanied by an increase in the locking torque which necessitates further power for starting.

Efforts to provide a suitable magnet configuration which will meet both requirements, i.e., satisfactory starting and locking torque, within allowable power limitations involves difficult calculations and expensive trial and error, and inherently involves compromise. It is therefore desirable to provide a permanent magnet rotor member for a rotary magnetic position indicator which will satisfy both requirements independently with minimum interaction thereby to provide optimum operation of the indicator.

SUMMARY OF THE INVENTION

In its broader aspects, the invention provides a rotor member for a rotary magnetic position indicator, the rotor member having an axis and comprising a permanent magnet structure which includes a first permanent section having a cylindrical outer surface coaxial with the axis, and a second permanent magnet section axially contiguous with the first section and having at least two polar projections joined by cylindrical surface portions coaxial with the axis, the first section having oppositely polarized areas at its outer surface, and the second section projections being oppositely polarized, the areas and projections of the same polarity being generally axially aligned.

It is accordingly an object of the invention to provide an improved rotor member for a rotary magnetic position indicator.

Another object of the invention is to provide an improved permanent magnet rotor member for a rotary magnetic position indicator which provides both adequate starting torque and locking torque.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 4 is a top view of the cylindrical permanent magnet employed in the improved rotor member of the invention;

FIG. 5 is a top view showing the cylindrical and salient pole permanent magnets in assembled relation;

FIG. 6 is a cross-section view taken generally along the line 6—6 of FIG. 5;

FIG. 7 is a fragmentary cross-sectional view taken along the same line as FIG. 6 but showing another embodiment of the invention;

FIG. 8 is a fragmentary cross-sectional view showing yet another embodiment of the invention; and FIG. 9 is a top view showing adaptation of the improved rotor member of the invention for use in a different form of stator structure.

DESCRIPTION OF THE PREFERRED EMBODIMENT

Figure 1:
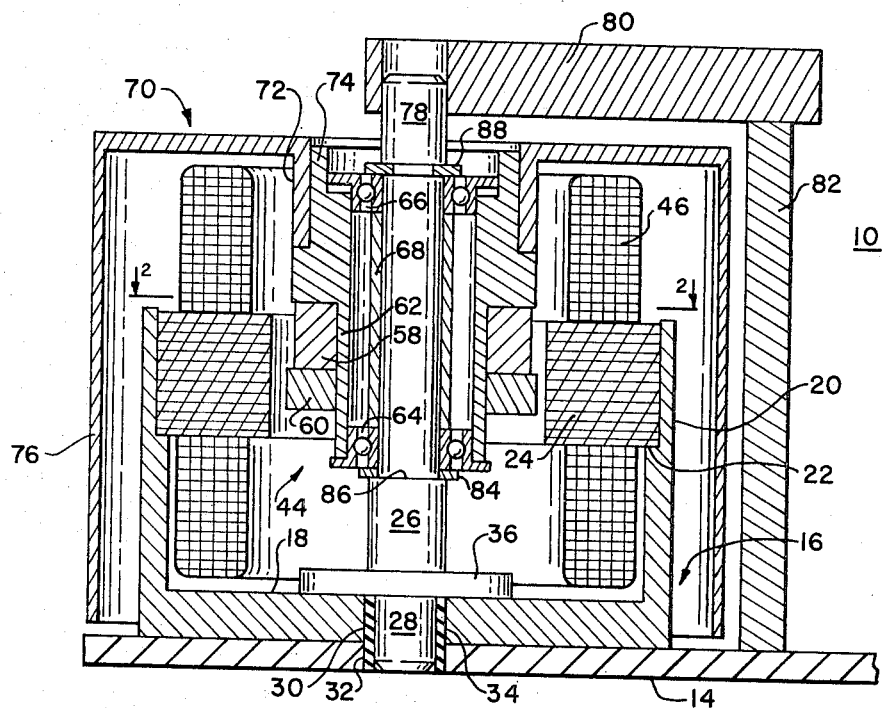
FIG. 1 is a side cross-sectional view illustrating one embodiment of a rotary magnetic position indicator incorporating the invention.

Referring now to FIGS. 1 through 6 of the drawings, the invention is described and illustrated in connection with a rotary magnetic position indicator, generally indicated at 10, having an odd number of positions, as further described and illustrated in U.S. Pat. No. 3,735,303 granted May 22, 1973, and also assigned to the assignee of the present application.

Indicator 10 comprises a base board 14 formed of suitable insulating material and which may have the conductors which are connected to the coils of the indicator printed thereon. A cup-shaped member 16 formed of suitable non-magnetic metal is provided having its bottom 18 adhered to base board 14. Side wall 20 of cup-shaped member 16 has shoulder 22 formed therein which supports stator core member 24. Stator core member 24 may be adhesively secured in its assembled position.

Shaft 26 has projection 28 which extends through aligned openings 30, 32 in bottom 18 of cup-shaped member 16 and base board 14, being secured therein by suitable adhesive material 34. Flange 36 on shaft 26 abuts the inner surface of bottom 18 of cup-shaped member 16 and is adhesively secured thereto.

Stator core member 24 is formed of suitable magnetic material and has yoke portion 38 with an odd number, shown here as eleven, radially inwardly extending, equally angularly spaced polar projections or teeth 40 formed thereon. Teeth 40 have inner ends 42 mutually defining a bore for receiving permanent magnet rotor member 44.

Figure 3:
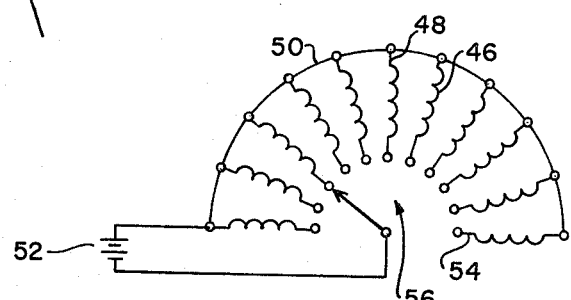
FIG. 3 is a schematic illustration showing the electrical connection of the coils of the indicator of FIGS. 1 and 2.

A distributed winding is provided on stator core member 24 comprising eleven coils 46 respectively spanning three adjacent teeth 40. Referring additionally to FIG. 3, ends 48 of coils 46 are connected together by a common connection 50 which may be a printed circuit connection on base board 14, common connection 50 being connected to one side of source 52 of direct current. The other ends 54 are connected, as by printed circuit connections on base board 14, to the switching system shown schematically at 56, which selectively couples coils 46, one at a time, for energization across source 52 so that the inner end 42 of a respective stator tooth 40 is polarized with a given polarity, such as North.

The stator core and winding arrangement thus far described is that shown in the aforesaid application Ser. No. 190,150 and does not form a part of the present invention.

Rotor assembly 44 comprises two abutting permanent magnets 58, 60 adhesively secured to sleeve member 62. Sleeve member 62 is rotatably mounted on shaft 26 by suitable bearings 64, 66 separated by spacer 68 surrounding shaft 26. Drum 70 formed of suitable material, such as aluminum, has inner flange 72 adhesively secured to hub portion 74 of sleeve member 62, and outer flange 76 upon which the indicia are displayed.

Upper extension portion 78 of shaft 26 is located and supported by frame elements 80, 82, mounted on base board 14. Lower bearing 64 engages thrust washer 84 seated on shoulder 86 on shaft 26, and the rotor assembly 44 is held in assembled relation by snap ring 88 which engages upper bearing 66.

Referring now additionally to FIGS. 4 through 6, permanent magnet 60 has cylindrical outer surface 90 and is polarized along magnetic axis 92 coincident with a diameter of magnet 60 to form oppositely polarized areas 94, 96 at the extremities of the diameter.

Figure 2:
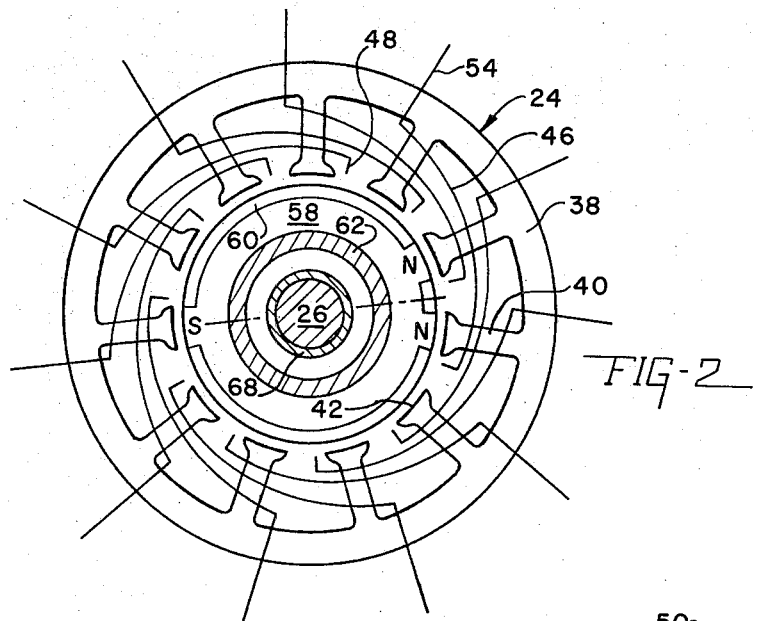
FIG. 2 is a top view, partly in cross section, taken along the line 2—2 of FIG. 1, showing the improved rotor member of the invention and schematically showing the stator structure.

In accordance with the teachings of the aforesaid U.S. Pat. No. 3,735,303 permanent magnet 58 has a first polar projection 98 and two polar projections 100-1, 100-2. Each of the polar projections 98, 100 has an outer end having generally the same angular extent as the inner ends 42 of stator teeth 40. Projections 100-1, 100-2 are equally spaced on opposite sides of diameter 102, and are respectively aligned with an adjacent pair of stator teeth 40. Projection 98 is aligned with another stator tooth 40, as shown in FIG. 2. Projections 98, 100 are joined by cylindrical surface portions 104. Permanent magnet 58 is magnetized on a magnetic axis coincident with diameter 102 thereby to polarize projections 98 with one polarity such as South, and projections 100-1, 100-2 with the opposite polarity, such as North.

In this embodiment, cylindrical permanent magnet 60 and salient pole permanent magnet 58 are oriented so that their respective magnetic axes 92, 102 are in axial alignment with South polar projection 98 and North polar projections 100-1, 100-2 respectively axially aligned with South polar area 94 and North polar area 96 of cylindrical permanent magnet 60.

It will be observed that cylindrical surface 90 of cylindrical magnet 60 and cylindrical surface portions 104 of permanent magnet 58 are coaxial with axis 106 of shaft 26.

In the specific embodiment illustrated, as best seen in FIG. 5, the diameter of permanent magnet 58 taken across polar projections 98, 100 is slightly less than the diameter of cylindrical permanent magnet 60. However, the diameters may be the same, or the diameter of permanent magnet 58 may be slightly greater than the diameter of cylindrical magnet 60, the relative diameters of permanent magnet 58 vis-a-vis permanent magnet 60 being a variable which is selectively adjustable in order to provide optimum starting and lock-in torques.

It will also be observed by reference to FIGS. 1 and 6 that salient pole permanent magnet 58 is axially thicker than cylindrical permanent magnet 60, the relative thicknesses of the two permanent magnets being another variable which may be selectively adjusted in order to provide optimum starting and lock-in torques.

In the embodiment of FIGS. 1–6, permanent magnets 58, 60 are two separate magnets in abutting relation. Referring now to FIG. 7 in which some elements are indicated by primed reference numerals an integral permanent magnet 108 may be provided having salient pole section 58' integrally formed with cylindrical section 60', as shown the configuration of the integral permanent magnet 108 otherwise being identical to that of the abutting permanent magnets 58, 60 of the previous figures.

Referring now to FIG 8 in which similar elements are indicated by double primed reference numerals, whether integrally formed as described above in connection with FIG. 7, or formed as two separate magnets as described above in connection with FIGS. 1–6, the diameter of permanent magnet 60 or permanent magnet section 60'' may be the same, or approximately the same as the diameter of the cylindrical surface portions 104, 104'' of the permanent magnet 58 or permanent magnet section 58'', with projections 98'', 100 (not shown in FIG 8) projecting radially outwardly beyond cylindrical surface 90'' of permanent magnets 60 or permanent magnet section 60''.

Referring now to FIG. 9 in which like elements are indicated by like reference numerals and similar elements by triple primed reference numerals, the salient pole permanent magnet 58''' is shown as having two diametrically opposite polar projections 98''', 100''' thus rendering the permanent magnet rotor suitable for use in a stator structure of the type shown for example in the aforesaid U.S. Pat. No. 3,478,349. Here, the magnetic and grain axes of the two magnets 58''', may be axially aligned, as shown by dashed lines 110. Alternatively, as further described in the aforesaid U.S. Pat. Nos. 3,416,015 and 3,478,349, the magnetic and grain axes of the salient pole permanent magnet 58''' may be aligned with one corner of polar projections 98''', 100''', as shown by the dashed line 112, and the magnetic and grain axes of magnet 60 being aligned with the centers of the polar projections, as shown by dashed line 110. A further alternative is to align the magnetic and grain axes of permanent magnet 58''' with the center of the projections, as shown by dashed line 110, and to align the magnetic and grain axes of permanent magnet 60 with the corners of the projections, as shown by dashed line 114. Still further, where two separate magnets are employed wth one of the permanent magnets being substantially thicker than the other, the grain axis of the salient pole permanent magnet 58''' may be aligned with one corner of each polar projection 98''', 100''' as shown by dashed line 112, the grain axis of cylindrical permanent magnet 60 may be aligned with the opposite corners of projections 98''', 100''' as shown by dashed line 114, and two permanent magnets may be magnetized simultaneously along the center line of the projections, as shown by dashed line 110 resulting in a magnetic unbalance which provides the desired detent action.

While there have been described above the principles of this invention in connection with specific apparatus, it is to be clearly understood that this description is made only by way of example and not as a limitation to the scope of the invention.

What is claimed is:

1. A rotor member for a rotary magnetic position indicator, said rotor member having an axis and comprising a permanent magnet structure which includes a first permanent magnet section having a cylindrical outer surface coaxial with said axis, and a second permanent magnet section axially contiguous with said first section and having at least two polar projections joined by cylindrical surface portions coaxial with said axis, said first section having oppositely polarized areas at said outer surface thereof, said second section projections being oppositely polarized, said areas and projections of the same polarity being generally aaxially aligned, there being three of said polar projections, one of said projections having one polarity and having one extremity of said second section magnetic axis extending substantially through the center thereof, the other two of said projections having the opposite polarity and being spaced on opposite sides of the other extremity of said second section magnetic axis.

* * * * *